(12) United States Patent
Mwamba (10) Patent No.: US 12,403,370 B1
(45) Date of Patent: Sep. 2, 2025

(54) REMOTE-CONTROLLED PUNCHING BAG

(71) Applicant: Clarence Mwamba, Corona, NY (US)

(72) Inventor: Clarence Mwamba, Corona, NY (US)

( * ) Notice: Subject to any disclaimer, the term of this patent is extended or adjusted under 35 U.S.C. 154(b) by 157 days.

(21) Appl. No.: 18/236,671

(22) Filed: Aug. 22, 2023

(51) Int. Cl.
*A63B 69/20* (2006.01)
*A63B 69/24* (2006.01)
*G05D 1/00* (2006.01)

(52) U.S. Cl.
CPC ............ *A63B 69/20* (2013.01); *A63B 69/24* (2013.01); *G05D 1/0011* (2013.01)

(58) Field of Classification Search
CPC ....... A63B 69/20; A63B 69/24; A63B 69/215; A63B 69/22; A63B 69/222; A63B 69/224; A63B 69/244; A63B 69/26; A63B 69/32; A63B 69/322; A63B 69/325; A63B 69/34
See application file for complete search history.

(56) References Cited

U.S. PATENT DOCUMENTS

| | | | |
|---|---|---|---|
| 5,100,138 A | 3/1992 | Wilde | |
| D353,698 S | 12/1994 | Stevens | |
| 7,704,194 B1 * | 4/2010 | Chen | A63B 69/224 482/90 |
| 8,721,476 B2 * | 5/2014 | Mayers | A63B 69/34 473/447 |
| 8,777,819 B1 | 7/2014 | Quintana | |
| 9,682,301 B2 * | 6/2017 | Connell | H04M 1/72415 |
| 10,603,565 B1 | 3/2020 | Gibson | |
| 2019/0106144 A1 | 4/2019 | McCall | |
| 2019/0118059 A1 | 4/2019 | Partio | |
| 2021/0008428 A1 | 1/2021 | Leon, III | |
| 2023/0226423 A1 * | 7/2023 | Leavitt | A63B 69/222 482/87 |
| 2024/0342572 A1 * | 10/2024 | Han | A63B 24/0062 |

FOREIGN PATENT DOCUMENTS

WO 9938722 8/1999

* cited by examiner

*Primary Examiner* — Megan Anderson
(74) *Attorney, Agent, or Firm* — Kyle A. Fletcher, Esq.

(57) ABSTRACT

The remote-controlled punching bag is a training device. The remote-controlled punching bag presents a dynamic punching bag to an athlete. The movement of the position of the presented punching bag requires the athlete to adapt their movements to the motion of the punching bag during the training process. The remote-controlled punching bag includes a punching bag structure, a pedestal structure, and a control circuit. The punching bag structure and the control circuit mount on the pedestal structure. The pedestal structure is a vehicle that moves punching bag structure relative to the athlete. The control circuit controls the movement and operation of the pedestal structure.

14 Claims, 5 Drawing Sheets

REMOTE-CONTROLLED PUNCHING BAG

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of apparatus generating stimulus signals for reaction-time training involving a substantial physical effort. (A63B69/0055)

SUMMARY OF INVENTION

The remote-controlled punching bag is a training device. The remote-controlled punching bag presents a dynamic punching bag to an athlete. By dynamic is meant that the position relative to the athlete is variable. The movement of the position of the presented punching bag requires the athlete to adapt their movements to the motion of the punching bag during the training process. The remote-controlled punching bag comprises a punching bag structure, a pedestal structure, and a control circuit. The punching bag structure and the control circuit mount on the pedestal structure. The pedestal structure is a vehicle that moves punching bag structure relative to the athlete. The control circuit controls the movement and operation of the pedestal structure.

These together with additional objects, features and advantages of the remote-controlled punching bag will be readily apparent to those of ordinary skill in the art upon reading the following detailed description of the presently preferred, but nonetheless illustrative, embodiments when taken in conjunction with the accompanying drawings.

In this respect, before explaining the current embodiments of the remote-controlled punching bag in detail, it is to be understood that the remote-controlled punching bag is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the remote-controlled punching bag.

It is therefore important that the claims be regarded as including such equivalent construction insofar as they do not depart from the spirit and scope of the remote-controlled punching bag. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
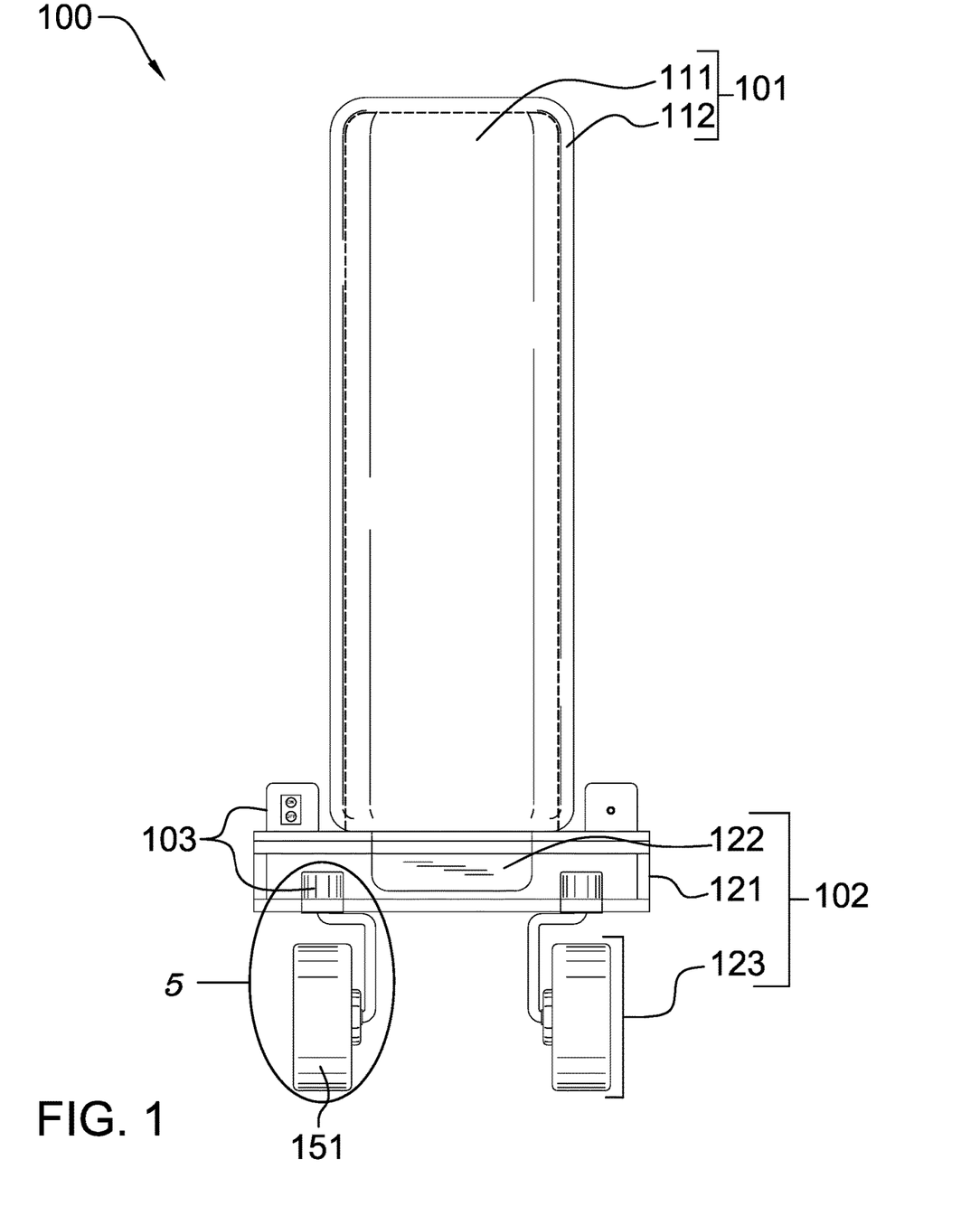
FIG. 1 is a front view of an embodiment of the disclosure.
Figure 2:
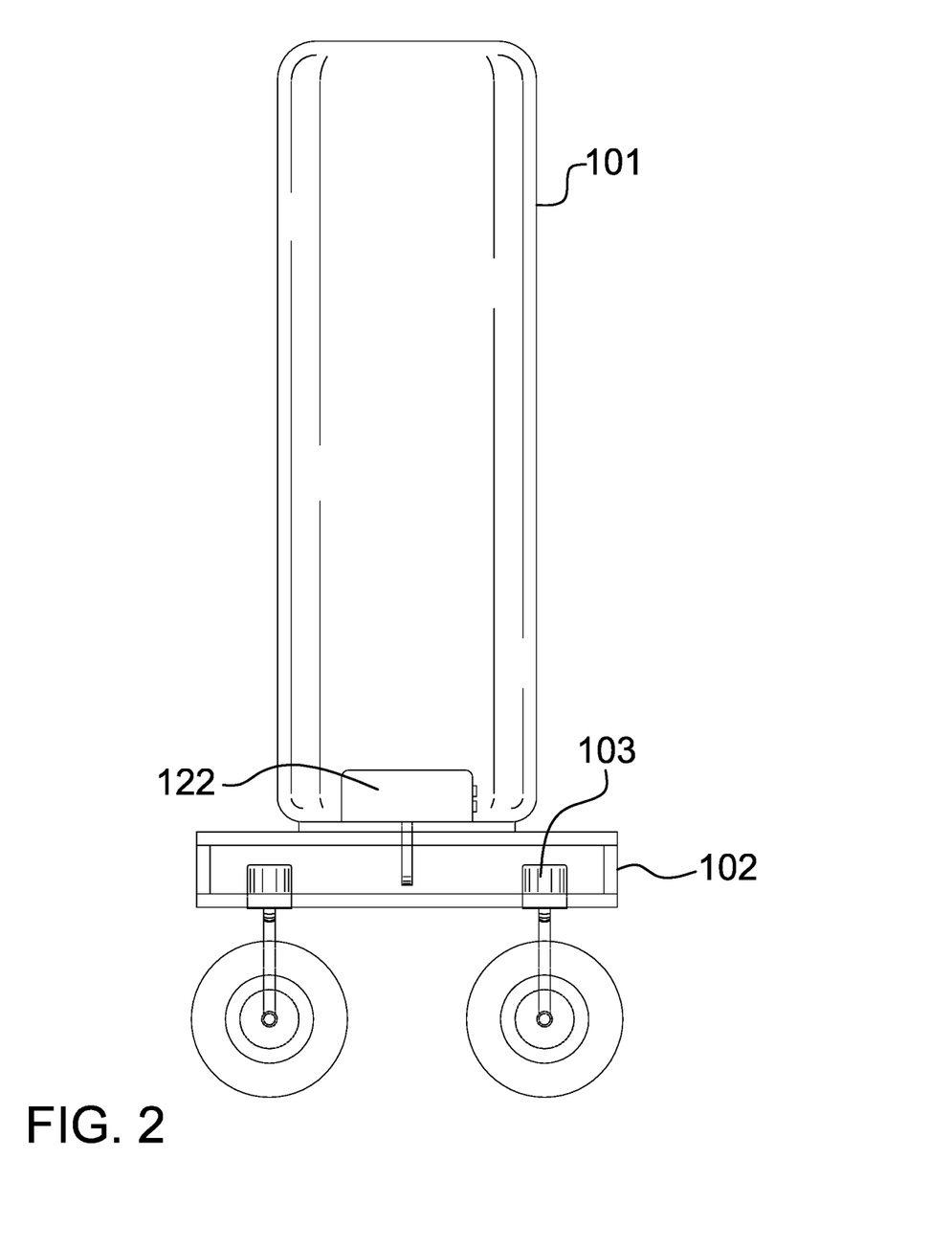
FIG. 2 is a side view of an embodiment of the disclosure.
Figure 3:
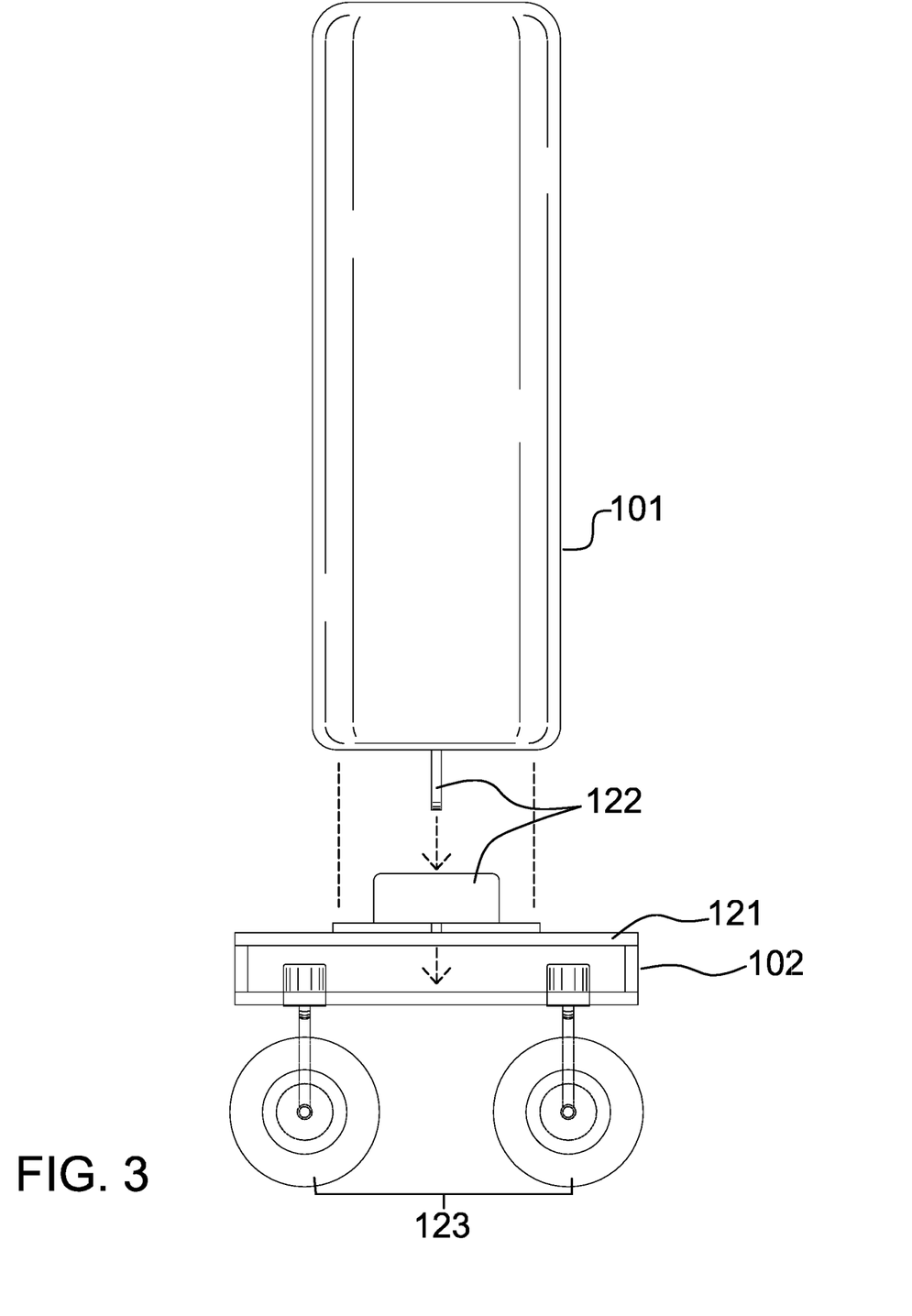
FIG. 3 is a reverse side view of an embodiment of the disclosure.
Figure 4:
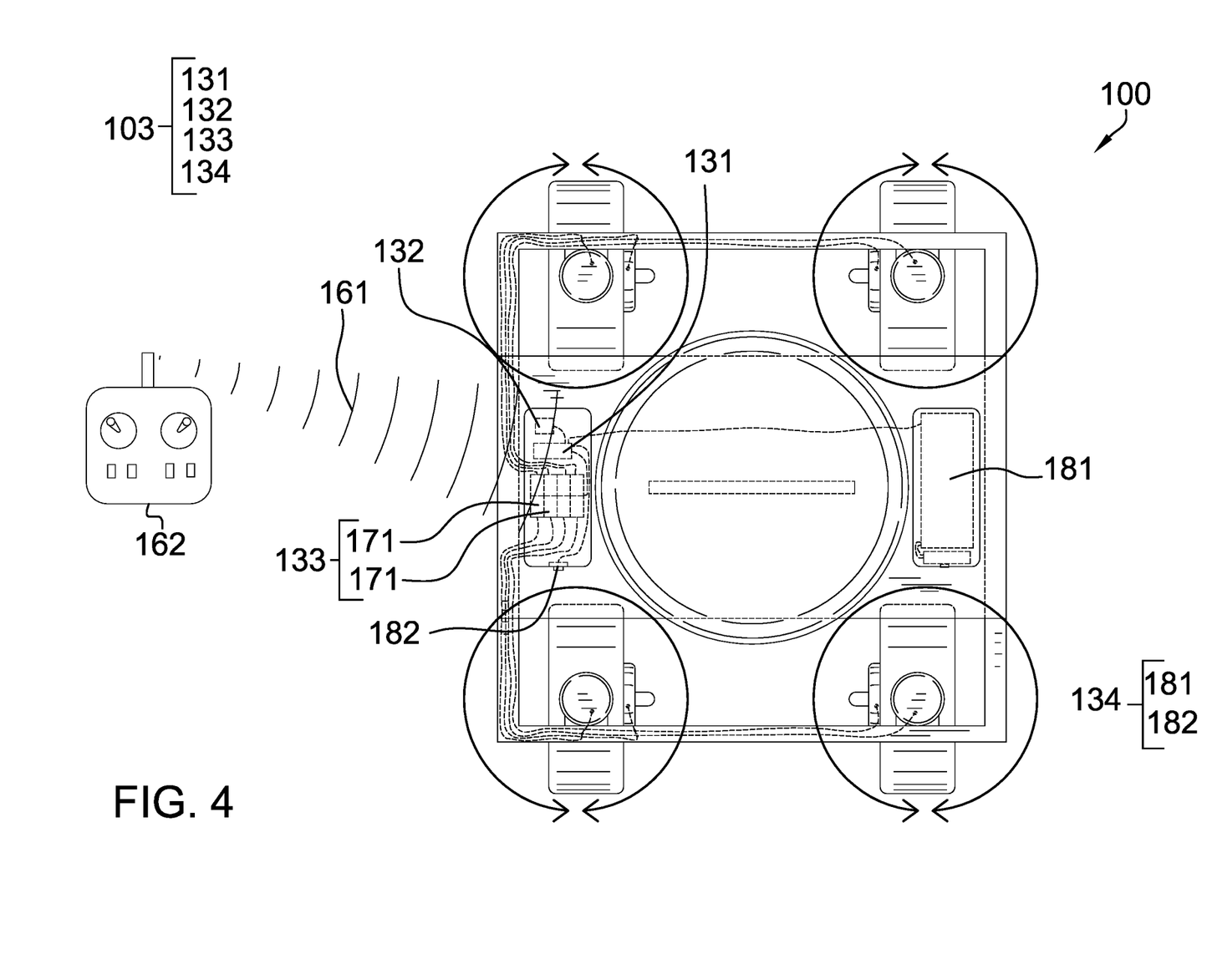
FIG. 4 is a top view of an embodiment of the disclosure.
Figure 5:
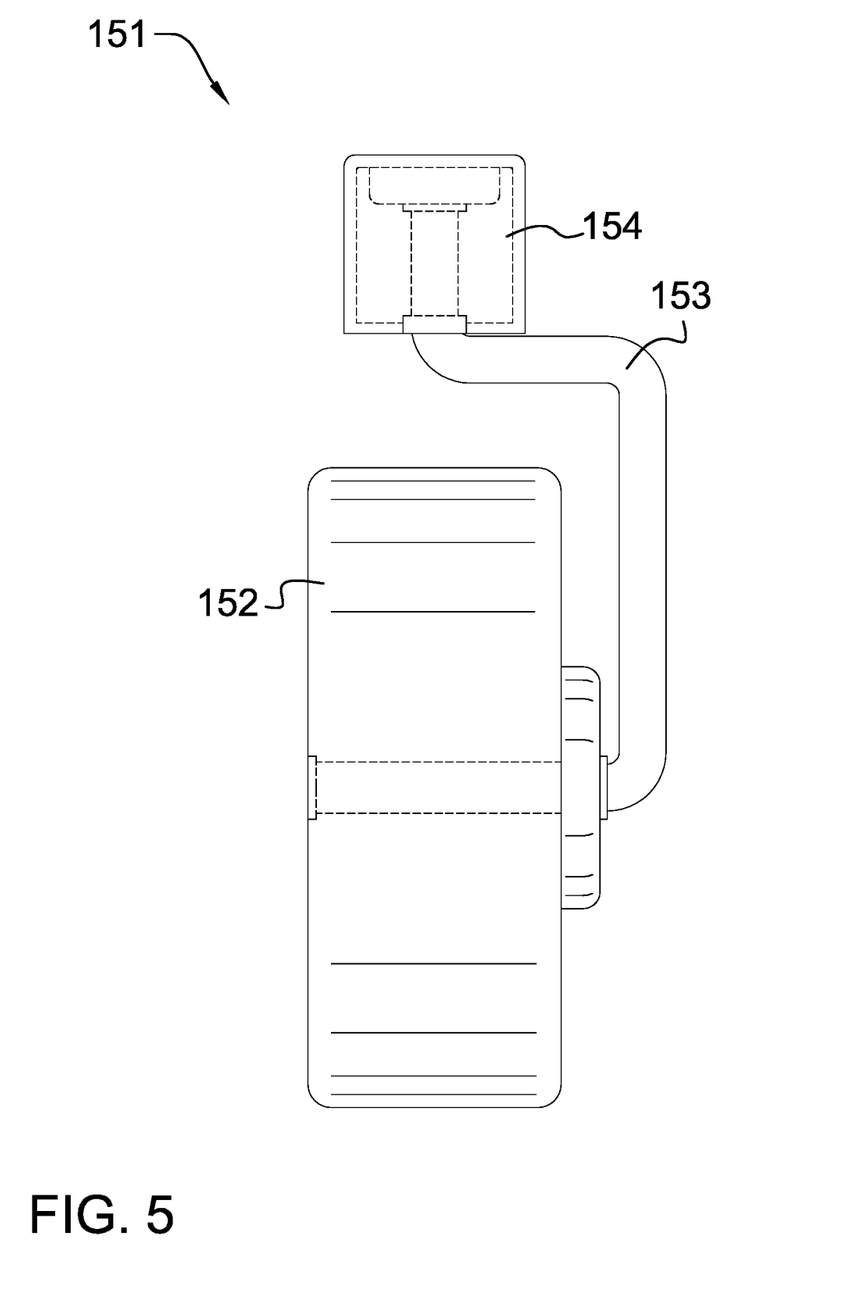
FIG. 5 is a detail view of an embodiment of the disclosure.

Detailed reference will now be made to one or more potential embodiments of the disclosure, which are illustrated in FIGS. 1 through 5.

The remote-controlled punching bag 100 (hereinafter invention) is a training device. The invention 100 presents a dynamic punching bag to an athlete. By dynamic is meant that the position relative to the athlete is variable. The movement of the position of the presented punching bag requires the athlete to adapt their movements to the motion of the punching bag during the training process. The invention 100 comprises a punching bag structure 101, a pedestal structure 102, and a control circuit 103. The punching bag structure 101 and the control circuit 103 mount on the pedestal structure 102. The pedestal structure 102 is a vehicle that moves punching bag structure 101 relative to the athlete. The control circuit 103 controls the movement and operation of the pedestal structure 102.

The punching bag structure 101 is the training structure of the invention 100. The punching bag structure 101 forms a target that is used in training for combat sports. The punching bag is defined elsewhere in this disclosure. The punching bag structure 101 mounts on the pedestal structure 102 such that the motion of the pedestal structure 102 moves the punching bag structure 101 relative to the athlete. The punching bag structure 101 mounts on the pedestal structure 102 such that the punching bag structure 101 moves relative to the pedestal structure 102 when the athlete strikes the punching bag structure 101.

The punching bag structure 101 comprises a core structure 111 and a padded exterior cover 112. The core structure 111 forms the interior structure of the punching bag structure 101. The core structure 111 forms the bulk of the mass of the punching bag structure 101. The padded exterior cover 112 forms the exterior surface of the punching bag structure 101.

The padded exterior cover 112 forms a padded structure that protects the hands of the athlete during the training process.

The pedestal structure 102 is a mechanical structure. The pedestal structure 102 is a load bearing structure. The pedestal structure 102 elevates the punching bag structure 101 above a supporting surface. The pedestal structure 102 is a vehicle. The pedestal structure 102 transports the punching bag structure 101 over the supporting surface. The pedestal structure 102 transfers the load of the punching bag structure 101 and the control circuit 103 to the supporting surface. The pedestal structure 102 comprises a pedestal disk structure 121, a punching bag mount 122, and a plurality of caster structures 123.

The pedestal disk structure 121 is a mechanical structure. The pedestal disk structure 121 is a disk shaped structure. The pedestal disk structure 121 is a load bearing structure. The punching bag structure 101 attaches to the pedestal disk structure 121 such that the motion of the pedestal disk structure 121 moves the punching bag structure 101 relative to the athlete. The punching bag structure 101 attaches to the superior congruent end of the disk shape of the pedestal disk structure 121. The pedestal disk structure 121 transfers the load of the punching bag structure 101 to the plurality of caster structures 123.

The punching bag mount 122 is a fastening structure. The punching bag mount 122 secures the punching bag structure 101 to the superior congruent end of the pedestal disk structure 121. The punching bag mount 122 is a rotating structure. The punching bag mount 122 rotates such that the punching bag structure 101 rotates around a pivot point when the pedestal structure 102 is struck by an athlete. The punching bag mount 122 is a spring loaded structure. The spring loaded structure is designed to return the major axis of the punching bag structure 101 to a vertical orientation over time.

The plurality of caster structures 123 forms the rolling structure of the pedestal structure 102. The plurality of caster structures 123 mounts on the inferior congruent end of the pedestal disk structure 121. The plurality of caster structures 123 transfers the load of the invention 100 to the supporting surface.

The plurality of caster structures 123 comprises a collection of individual caster structures 151. Each individual caster structure 151 selected from the plurality of caster structures 123 is a caster. Each individual caster structure 151 selected from the plurality of caster structures 123 is identical. Each selected individual caster structure 151 electrically connects to the control circuit 103.

The control circuit 103 controls the operation of each individual caster structure 151 selected from the plurality of caster structures 123. By controlling the operation of the plurality of caster structures 123 is meant that the control circuit 103 powers the operation of each individual caster structure 151 selected from the plurality of caster structures 123. By controlling the operation of the plurality of caster structures 123 is further meant that the control circuit 103 controls the speed of rotation of each individual caster structure 151 selected from the plurality of caster structures 123. By controlling the operation of the plurality of caster structures 123 is further meant that the control circuit 103 controls the direction of rotation of each individual caster structure 151 selected from the plurality of caster structures 123. The operation of any initial individual caster structure 151 selected from the plurality of caster structures 123 is independent of the operation and control of any subsequent individual caster structure 151 selected from the plurality of caster structures 123.

Each individual caster structure 151 selected from the plurality of caster structures 123 is a rotating structure. Each individual caster structure 151 selected from the plurality of caster structures 123 forms a portion of the load path that transfers the load of the invention 100 to the supporting surface. Each selected individual caster structure 151 elevates the pedestal disk structure 121 above the supporting surface. Each selected individual caster structure 151 rolls over the supporting surface when the plurality of caster structures 123 transports the pedestal disk structure 121 along the supporting surface. Each individual caster structure 151 selected from the plurality of caster structures 123 further comprises a wheel structure 152, a swivel structure 153, and a drive motor 154.

The wheel structure 152 is a wheel. The wheel structure forms the rotating structure of each individual caster structure 151 selected from the plurality of caster structures 123. The swivel structure 153 is a swivel. The swivel structure 153 attaches the wheel structure 152 to the pedestal disk structure 121 such that the wheel structure 152 rotates relative to the pedestal disk structure 121. The drive motor 154 is an electric motor. The drive motor 154 converts electric energy into rotational energy. The drive motor 154 generates the motive forces used to rotate the wheel structure 152.

The control circuit 103 is an electric circuit. The control circuit 103 controls the operation of the drive motor 154 of each individual caster structure 151 selected from the plurality of caster structures 123. The control circuit 103 controls the motion of the pedestal structure 102 relative to the athlete. The control circuit 103 provides each drive motor with the electric energy necessary for the operation of the drive motor 154. The control circuit 103 is a remotely controlled device. The control circuit 103 allows an appropriate authority to control the movement of the punching bag structure 101 relative to the athlete during the training process. The control circuit 103 is an independently powered electric circuit. By independently powered is meant that the control circuit 103 can operate without an electrical connection to an external power source.

The control circuit 103 comprises a logic module 131, a communication module 132, a plurality of motor controllers 133, and a power circuit 134. The logic module 131, the communication module 132, the plurality of motor controllers 133, and the power circuit 134 are electrically interconnected.

The logic module 131 is a programmable electronic device that is used to manage, regulate, and operate the control circuit 103. The communication module 132 is a wireless electronic communication device that allows the logic module 131 to wirelessly communicate with a remote control module 162. The communication module 132 further comprises a first wireless communication link 161 and the remote control module 162. The communication module 132 forms the first wireless communication link 161 with the remote control module 162.

The remote control module 162 is an electrical device. The remote control module 162 forms an interface between an appropriate authority and the control circuit 103. The remote control module 162 transmits operating instructions over the first wireless communication link 161 to the control circuit 103. The transmitted operating instructions allow the appropriate authority to control the movement of the punching bag structure 101 relative to the athlete during training. The communication module 132 receives the transmitted operating instructions and relays the received operating instructions to the logic module 131.

Each individual motor controller 171 selected from the plurality of motor controllers 133 is a motor controller. Each selected individual motor controller 171 electrically connects to the logic module 131. Each selected individual motor controller 171 is independently controlled by the logic module 131. Each selected individual motor controller 171 electrically connects to the drive motor 154 of an individual caster structure 151 selected from the plurality of caster structures 123.

Under the direction of the logic module 131, each individual motor controller 171 selected from the plurality of motor controllers 133 controls the operation of the drive motor 154 associated with (electrically connected to) the selected individual motor controller 171. By controlling the operation of the drive motor 154 is meant that the selected individual motor controller 171 controls the speed of rotation of the associated drive motor 154. By controlling the operation of the drive motor 154 is further meant that the selected individual motor controller 171 controls the direction of rotation of the associated drive motor 154.

The power circuit 134 is an electric circuit. The power circuit 134 provides the control circuit 103 with the energy necessary for operation. The power circuit 134 further provides the plurality of motor controllers 133 with the electric energy necessary for the operation of the drive motor 154 of each individual caster structure 151 selected from the plurality of caster structures 123. The power circuit 134 further comprises a battery 181 and a power switch 182. The battery 181 is an electrochemical device. The battery 181 converts chemical potential energy into electric energy. The battery 181 provides the electric energy necessary to operate the invention 100. The power switch 182 is an electric switch. The power switch 182 is a maintained switch. The power switch 182 controls the flow of electric energy between the battery 181 and the balance of the control circuit 103. The power switch 182 enables and disables the operation of the control circuit 103.

The following definitions were used in this disclosure:

Aim and Target: As used in this disclosure, the words aim and target are related and are defined together. The word aim means to select the course of the movement of a first object along a path. The target is a second object that lies on the route of the first object such that such that an impact will occur between the first object and the second object.

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Appropriate Authority: As used in this disclosure, an appropriate authority is a previously determined person or organization that is designated to send and receive alarm or other notification messages regarding a monitored system or activity.

Battery: As used in this disclosure, a battery is a chemical device consisting of one or more cells, in which chemical energy is converted into electricity and used as a source of power. Batteries are commonly defined with a positive terminal and a negative terminal.

Bluetooth™: As used in this disclosure, Bluetooth™ is a standardized communication protocol that is used to wirelessly interconnect electronic devices.

Cant: As used in this disclosure, a cant is an angular deviation from one or more reference lines (or planes) such as a vertical line (or plane) or a horizontal line (or plane).

Caster: As used in this disclosure, a caster is a wheel that is mounted on a swivel that allows the wheel to adjust, or swivel, the direction of rotation of the wheel to the direction of motion desired for the wheel. The generic parts of a caster are called the stem, the swivel bearing, the swivel mount and the wheel. The swivel bearing attaches the stem to the swivel mount such that the swivel mount will rotate relative to the stem. The wheel attaches to the swivel mount such that the wheel freely rotates relative to the swivel mount. The direction of the axis of rotation of the wheel is perpendicular to the direction of the axis of rotation of the swivel mount. The stem attaches the swivel bearing, the swivel mount, and the wheel to an externally provided object.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Center of Rotation: As used in this disclosure, the center of rotation is the point of a rotating plane that does not move with the rotation of the plane. A line within a rotating three-dimensional object that does not move with the rotation of the object is also referred to as an axis of rotation.

Channel: As used in this disclosure, a channel is a previously determined frequency of electromagnetic radiation that is used for wireless communication. Wireless communication structures often designate a plurality of channels which allows users to "change the channel" when a previously specified channel is experiencing some form of interference.

Communication Link: As used in this disclosure, a communication link refers to the structured exchange of data between two objects.

Composite Prism: As used in this disclosure, a composite prism refers to a structure that is formed from a plurality of structures selected from the group consisting of a prism structure, a pyramid structure, and a spherical structure. The plurality of selected structures may or may not be truncated or bifurcated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Course: As used in this disclosure, a course refers to the direction, and changes to the direction, that are required to travel from a starting point to a destination point.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Energy: As used in this disclosure, the energy is a term used in physics. Energy refers to the ability of a system to do work. Energy is a conserved property of a system. Energy is a quantifiable and is generally expressed in units of Joules.

Environment: As used in this disclosure, an environment refers to the physical conditions surrounding an object. The term environment is often limited to the physical conditions that the object interacts with.

Exterior: As used in this disclosure, the exterior is used as a relational term that implies that an object is not contained within the boundary of a structure or a space.

External Power Source: As used in this disclosure, an external power source is a source of the energy that is externally provided to enable the operation of the present disclosure. Examples of external power sources include, but are not limited to, electrical power sources and compressed air sources.

Force: As used in this disclosure, a force refers to a net (or unopposed) measurable interaction that changes the direction of motion of an object, the velocity of motion of an object, the momentum of an object, or the stress within an object. The term work refers to a measure of the amount of energy that is transferred through the application of a force over a distance. The term power refers to a measure of the amount of energy that is transferred over a period of time.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1. By the term essentially geometrically similar is meant that the primary shapes of two objects are geometrically similar except that there are functional items (such as fastening devices) associated with the primary shape may not maintain the ratio for geometric similarity. By the term roughly geometrically similar is meant that the form factors between the primary shape of the two objects can vary by a factor of up to 10% when the two objects are normalized to be roughly geometrically identical.

GPS: As used in this disclosure, and depending on the context, GPS refers to: a) a system of navigational satellites that are used to determine the position, known as GPS coordinates, and velocity of a person or object; b) the system of navigational satellites referred to in the first definition that are used to synchronize to global time; or, c) an electronic device or that uses the system of navigational satellites referred to in the first definition to determine the position of a person or object. GPS is an acronym for Global Positioning System. Methods to determine the distance and direction between any two sets of GPS coordinates are well-known and documented in the navigational arts.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Impact: As used in this disclosure, an impact refers to an exchange of momentum between two objects over a duration. An impact often refers to a collision between two objects.

Inferior: As used in this disclosure, the term inferior refers to a directional reference that is parallel to and in the same direction as the force of gravity when an object is positioned or used normally.

Independent: As used in this disclosure, the term independent refers to the relationship between the operation and control of a first device and a second device. The first device and the second device are independent from each other if: a) the operation of the first device is neither impacted nor influenced by the operation of the second device; and, b) the operation of the second device is neither impacted nor influenced by the operation of the first device.

Interior: As used in this disclosure, the interior is used as a relational term that implies that an object is contained within the boundary of a structure or a space.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Logic Module: As used in this disclosure, a logic module is a readily and commercially available electrical device that accepts digital and analog inputs, processes the digital and analog inputs according to previously specified logical processes and provides the results of these previously specified logical processes as digital or analog outputs. The disclosure allows, but does not assume, that the logic module is programmable.

Maintained Switch: As used in this disclosure, a maintained switch is a switch that maintains the position that was set in the most recent switch actuation. A maintained switch works in an opposite manner to a momentary switch.

Major and Minor Axes: As used in this disclosure, the major and minor axes refer to a pair of perpendicular axes that are defined within a structure. The length of the major axis is always greater than or equal to the length of the minor axis. The major axis forms the longest symmetric bifurcation of a structure selected from the group consisting of: a) the structure; or, b) the perimetrical boundary of the structure. The major and minor axes intersect at the center of the structure. The major axis is always parallel or perpendicular to an edge of a rectangular or rectilinear structure.

Messaging Facility: As used in this disclosure, a messaging facility is a previously determined formatting structure through which a text or image (referred to in this definition as text) based communication is transmitted for delivery. A messaging facility is selected from the group consisting of a traditional messaging facility, a direct messaging facility and a broadcast messaging facility. A traditional messaging facility includes the delivery of a physical object containing the text based communication. The direct messaging facility includes communications that are addressed to a previously identified group of recipients. The broadcast messaging facility includes communications that are transmitted without the prior identification of the intended group of recipients. An example of a traditional messaging facility includes, but is not limited to, postal delivery. Examples of a direct messaging facilities include, but are not limited to, email, audio based communications, and SMS messages. A social media service is an example of a broadcast messaging facility.

Momentary Switch: As used in this disclosure, a momentary switch is a biased switch in the sense that the momentary switch has a baseline position that only changes when the momentary switch is actuated (for example when a pushbutton switch is pushed or a relay coil is energized). The momentary switch then returns to the baseline position once the actuation is completed. This baseline position is called the "normal" position. For example, a "normally open" momentary switch interrupts (open) the electric circuit in the baseline position and completes (closes) the circuit when the momentary switch is activated. Similarly, a "normally closed" momentary switch will complete (close) an electric circuit in the baseline position and interrupt (open) the circuit when the momentary switch is activated.

Momentum: As used in this disclosure, momentum is a measured quantity associated with the mass of a moving object. The momentum of the object equals the mass of the object multiplied by the velocity of the object. The exchange of momentum between two objects is a conserved quantity meaning that the sum of the momentums of the two objects before an exchange of momentum equals the sum of the momentums of the two objects after the exchange.

Negative Space: As used in this disclosure, negative space is a method of defining an object through the use of open or empty space as the definition of the object itself, or, through the use of open or empty space to describe the boundaries of an object.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan are open.

Path: As used in this structure, a path is a marked or identified route along which an individual or object can travel. A path is often formed as a track, a road or a trail.

PDD: As used in this disclosure, PDD is an acronym for personal data device.

Pedestal: As used in this disclosure, a pedestal is an intermediary load bearing structure that forms a load path between two objects or structures.

Perimeter: As used in this disclosure, a perimeter is one or more curved or straight lines that bounds an enclosed area on a plane or surface. The perimeter of a circle is commonly referred to as a circumference.

Perimetrical Boundary: As used in this disclosure, a perimetrical boundary is a hypothetical rectangular block that contains an object. Specifically, the rectangular block selected to be the perimetrical boundary is the rectangular block with the minimum volume that fully contains the object. In a two-dimensional structure, the perimetrical boundary is the rectangle with the minimum surface area.

Personal Data Device: As used in this disclosure, a personal data device is a handheld logical device that is used for managing personal information and communication. Examples of personal data device include, but are not limited to, cellular phones, tablets, and smartphones.

Primary Shape: As used in this disclosure, the primary shape refers to a description of the rough overall geometric shape of an object that is assembled from multiple components or surfaces. Use Roughly Primary Structure: As used in this disclosure, a primary structure refers to the component of an object that the other components attach to. The primary structure is also called the base structure.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Punching Bags and Speed Bags: As used in this disclosure, a punching bag is a structure that is suspended above the ground. The punching bag is designed to receive punches and other blows from exercisers for physical training purposes, especially for combat sports such as boxing or mixed martial arts. Punching bags are differentiated by form and weight. Traditionally a heavy bag is cylindrically shaped punching bag that is intended to simulate the torso of an opponent. The heavy bag has a weight that emulates the weight of a torso. The speed bag is traditionally spherically or pear shaped. The speed bag is a light weight structure (less than 10 pounds) used to hand eye coordination training. The undercut bag is a spherical structure of intermediate weight. By intermediate weight is meant that the weight of the undercut bag is between the weight of the heavy bag and a speed bag. The undercut bag is used as a target structure used for teach and practice punch combinations.

Rotation: As used in this disclosure, rotation refers to the cyclic movement of an object around a fixed point or fixed axis. The verb of rotation is to rotate.

Remote Control: As used in this disclosure, remote control means the establishment of control of a device from a distance. Remote control is generally accomplished through the use of an electrical device that generates electrically based control signals that are transmitted via radio frequencies or other means to the device.

Route: As used in this disclosure, a route refers to the course that is taken to travel from a starting point to a destination point.

Stanchion: As used in this disclosure, a stanchion refers to a vertically oriented prism-shaped pole, post, or support.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

Switch: As used in this disclosure, a switch is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

Swivel: As used in this disclosure, a swivel is a fastening structure that attaches a first object to a second object such that will rotate around an axis of rotation while the second object remains in a fixed position relative to the first object.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Wheel: As used in this disclosure, a wheel is a circular object that revolves around an axle or an axis and is fixed below an object to enable it to move easily over the ground. For the purpose of this disclosure, it is assumed that a wheel can only revolve in a forward and a backward direction. Wheels are often further defined with a rim and spokes. Spokes are also commonly referred to as a wheel disk.

WiFi™: As used in this disclosure, WiFi™ refers to the physical implementation of a collection of wireless electronic communication standards commonly referred to as IEEE 802.11x.

Wireless: As used in this disclosure, wireless is an adjective that is used to describe a communication link between two devices that does not require the use of physical cabling.

Wireless Communication Link: As used in this disclosure, a wireless communication link is a previously determined channel that is used to wirelessly exchange information between one or more transceivers.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:
1. A remote-controlled punching bag comprising
a punching bag structure, a pedestal structure, and a control circuit;
wherein the punching bag structure and the control circuit mount on the pedestal structure;
wherein the pedestal structure is a vehicle that moves punching bag structure;
wherein the control circuit controls the movement and operation of the pedestal structure;
wherein the pedestal structure transports the punching bag structure over a supporting surface;
wherein the pedestal structure transfers the load of the punching bag structure and the control circuit to the supporting surface;
wherein the pedestal structure comprises a pedestal disk structure, a punching bag mount, and a plurality of caster structures;
wherein the punching bag mount and the plurality of caster structures attach to the pedestal disk structure;
wherein the punching bag mount is a fastening structure;
wherein the punching bag mount secures the punching bag structure to the superior congruent end of the pedestal disk structure;
wherein the punching bag mount is a spring loaded structure;
wherein the spring loaded structure returns the major axis of the punching bag structure to a vertical orientation over time.

2. The remote-controlled punching bag according to claim 1
wherein the remote-controlled punching bag is a training device;
wherein the remote-controlled punching bag presents a dynamic punching bag.

3. The remote-controlled punching bag according to claim 2
wherein the punching bag structure is the training device of the remote-controlled punching bag;
wherein the punching bag structure forms a target.

4. The remote-controlled punching bag according to claim 3
   wherein the punching bag structure comprises a core structure and a padded exterior cover;
   wherein the core structure forms the interior structure of the punching bag structure;
   wherein the core structure forms the bulk of the mass of the punching bag structure;
   wherein the padded exterior cover forms the exterior surface of the punching bag structure;
   wherein the padded exterior cover forms a padded structure.

5. The remote-controlled punching bag according to claim 4
   wherein the pedestal structure is a mechanical structure;
   wherein the pedestal structure is a load bearing structure.

6. The remote-controlled punching bag according to claim 5
   wherein the pedestal disk structure is a mechanical structure;
   wherein the pedestal disk structure is a disk shaped structure;
   wherein the pedestal disk structure is a load bearing structure;
   wherein the punching bag structure attaches to the pedestal disk structure;
   wherein the punching bag structure attaches to the superior congruent end of the disk shape of the pedestal disk structure;
   wherein the pedestal disk structure transfers the load of the punching bag structure to the plurality of caster structures.

7. The remote-controlled punching bag according to claim 6
   wherein the plurality of caster structures forms the rolling structure of the pedestal structure;
   wherein the plurality of caster structures mounts on the inferior congruent end of the pedestal disk structure;
   wherein the plurality of caster structures transfers the load of the remote-controlled punching bag to the supporting surface;
   wherein the plurality of caster structures comprises a collection of individual caster structures;
   wherein each individual caster structure selected from the plurality of caster structures is a caster;
   wherein each individual caster structure selected from the plurality of caster structures is identical.

8. The remote-controlled punching bag according to claim 7
   wherein each individual caster structure electrically connects to the control circuit;
   wherein the control circuit controls the operation of each individual caster structure selected from the plurality of caster structures;
   wherein by controlling the operation of the plurality of caster structures the control circuit powers the operation of each individual caster structure selected from the plurality of caster structures;
   wherein by controlling the operation of the plurality of caster structures the control circuit controls the speed of rotation of each individual caster structure selected from the plurality of caster structures;
   wherein by controlling the operation of the plurality of caster structures the control circuit controls the direction of rotation of each individual caster structure selected from the plurality of caster structures;
   wherein the operation of any initial individual caster structure selected from the plurality of caster structures is independent of the operation and control of any subsequent individual caster structure selected from the plurality of caster structures.

9. The remote-controlled punching bag according to claim 8
   wherein each individual caster structure selected from the plurality of caster structures is a rotating structure;
   wherein each individual caster structure selected from the plurality of caster structures forms a portion of the load path that transfers the load of the remote-controlled punching bag to the supporting surface;
   wherein each individual caster structure elevates the pedestal disk structure above the supporting surface;
   wherein each individual caster structure rolls over the supporting surface when the plurality of caster structures transports the pedestal disk structure along the supporting surface.

10. The remote-controlled punching bag according to claim 9
    wherein each individual caster structure selected from the plurality of caster structures further comprises a wheel structure, a swivel structure, and a drive motor;
    wherein the wheel structure is a wheel;
    wherein the wheel structure forms the rotating structure of each individual caster structure selected from the plurality of caster structures;
    wherein the swivel structure is a swivel;
    wherein the swivel structure attaches the wheel structure to the pedestal disk structure such that the wheel structure rotates relative to the pedestal disk structure;
    wherein the drive motor is an electric motor;
    wherein the drive motor converts electric energy into rotational energy;
    wherein the drive motor generates the motive forces used to rotate the wheel structure.

11. The remote-controlled punching bag according to claim 10
    wherein the control circuit is an electric circuit;
    wherein the control circuit controls the operation of the drive motor of each individual caster structure selected from the plurality of caster structures;
    wherein the control circuit controls the motion of the pedestal structure;
    wherein the control circuit provides each drive motor with the electric energy necessary for the operation of the drive motor;
    wherein the control circuit is a remotely controlled device;
    wherein the control circuit is an independently powered electric circuit;
    wherein the control circuit is configured to operate without an electrical connection to an external power source.

12. The remote-controlled punching bag according to claim 11
    wherein the control circuit comprises a logic module, a communication module, a plurality of motor controllers, and a power circuit;
    wherein the logic module, the communication module, the plurality of motor controllers, and the power circuit are electrically interconnected.

13. The remote-controlled punching bag according to claim 12
    wherein the logic module is a programmable electronic device;

wherein the communication module is a wireless electronic communication device that allows the logic module to wirelessly communicate with a remote control module;

wherein the communication module further comprises a first wireless communication link and the remote control module;

wherein the communication module forms the first wireless communication link with the remote control module;

wherein the remote control module is an electrical device;

wherein the remote control module transmits operating instructions over the first wireless communication link to the control circuit;

wherein the communication module receives the transmitted operating instructions and relays the received operating instructions to the logic module.

14. The remote-controlled punching bag according to claim 13 wherein each individual motor controller selected from the plurality of motor controllers is a motor controller;

wherein each individual motor controller electrically connects to the logic module;

wherein each individual motor controller is independently controlled by the logic module;

wherein each individual motor controller electrically connects to the drive motor of an individual caster structure selected from the plurality of caster structures;

wherein under the direction of the logic module, each individual motor controller selected from the plurality of motor controllers controls the operation of the drive motor associated with the selected individual motor controller;

wherein by controlling the operation of the drive motor the individual motor controller controls the speed of rotation of the associated drive motor;

wherein by controlling the operation of the drive motor the individual motor controller controls the direction of rotation of the associated drive motor.

* * * * *